US007610020B2

(12) United States Patent
Jokinen et al.

(10) Patent No.: US 7,610,020 B2
(45) Date of Patent: Oct. 27, 2009

(54) METHOD OF AND SYSTEM FOR WIRELESS COMMUNICATION

(75) Inventors: Harri Jokinen, Pertteli (FI); Johanna Pekonen, Espoo (FI)

(73) Assignee: Nokia Corporation, Espoo (FI)

( * ) Notice: Subject to any disclaimer, the term of this patent is extended or adjusted under 35 U.S.C. 154(b) by 835 days.

(21) Appl. No.: 10/732,538

(22) Filed: Dec. 11, 2003

(65) Prior Publication Data
US 2005/0054364 A1 Mar. 10, 2005

(30) Foreign Application Priority Data
Aug. 18, 2003 (GB) ................... 0319361.2

(51) Int. Cl.
*H04B 7/00* (2006.01)
(52) U.S. Cl. .............. 455/69; 455/522; 455/67.11; 455/515
(58) Field of Classification Search .......... 455/522, 455/69, 41.2, 41.3, 410, 517, 68, 67.11, 420, 455/452.2, 454, 126, 134, 135, 9, 450, 515, 455/67.13, 511; 370/337, 347, 345, 328, 370/338
See application file for complete search history.

(56) References Cited

U.S. PATENT DOCUMENTS

| 6,308,080 | B1 * | 10/2001 | Burt et al. ............... 455/522 |
| 6,928,295 | B2 * | 8/2005 | Olson et al. ............. 455/522 |
| 2002/0045460 | A1 * | 4/2002 | Makinen et al. ........... 455/522 |
| 2002/0181423 | A1 * | 12/2002 | Chen et al. .............. 370/337 |
| 2003/0134655 | A1 * | 7/2003 | Chen et al. .............. 455/522 |
| 2004/0266447 | A1 * | 12/2004 | Terry .................... 455/450 |
| 2005/0163095 | A1 * | 7/2005 | Raleigh et al. ........... 370/345 |

(Continued)

FOREIGN PATENT DOCUMENTS

EP 0 999 656 A1 5/2000

(Continued)

OTHER PUBLICATIONS

3GPP TS 22.146 V6.2.Q (Mar. 2003), 3rd Generation Partnership Project, Technical Specification Group Services and System Aspects, Multimedia Broadcast/Multicast Service, Stage 1, Release 6, Mar. 2003, pp. 1-17, 3GPP, Valbonne, France, retrieved from Internet: <3gpp.org/ftp/Specs/archive/22_series/22.146/>.

(Continued)

*Primary Examiner*—John J Lee
(74) *Attorney, Agent, or Firm*—Squire, Sanders & Dempsey, LLP

(57) ABSTRACT

A method of wireless communication with a first station arranged to transmit at least one transmission to be received by a plurality of second stations to provide a point to multipoint transmission. A first determining step determines in at least one of a plurality of second stations, if at least one transmission which is received at least one second station satisfies predetermined criterias. In response to information determined in said first determining step, a second determining step determines if a first station is to change a power level with which the first station transmits to the plurality of second stations in a point to multipoint transmission. A power changing step changes the power level with which said first station transmits power if the second determining step determines that the power level is to be changed.

18 Claims, 4 Drawing Sheets

U.S. PATENT DOCUMENTS

2007/0129096 A1* 6/2007 Okumura et al. ............ 455/522

FOREIGN PATENT DOCUMENTS

| EP | 1 063 782 A2 | 12/2000 |
| EP | 1 143 635 A1 | 10/2001 |
| WO | WO 03/096149 A2 | 11/2003 |
| WO | WO 2004/013981 A2 | 2/2004 |

OTHER PUBLICATIONS

3GPP TS 23.246 V.6.0.0 (Sep. 2003), 3rd Generation Partnership Project, Technical Specification Group Services and System Aspects, Multimedia Broadcast/Multicast Service (MBMS), Architecture and Functional Description, Release 6, Sep. 2003, pp. 1-37, 3GPP, Valbonne, France, retrieved from Internet: <3gpp.org/ftp/Specs/archive/23_series/23.246/>.

3GPP TS 45.002 V6.4.0 (Nov. 2003), 3rd Generation Partnership Project, Technical Specification Group GSM/Edge, Radio Access Network, Mutliplexing and Multiple Access on the Radio Path, Release 6, Nov. 2003, pp. 1-88, 3GPP, Valbonne, France, retrieved from Internet: <3gpp.org/ftp/Specs/archive/45_series/45.002/>.

* cited by examiner

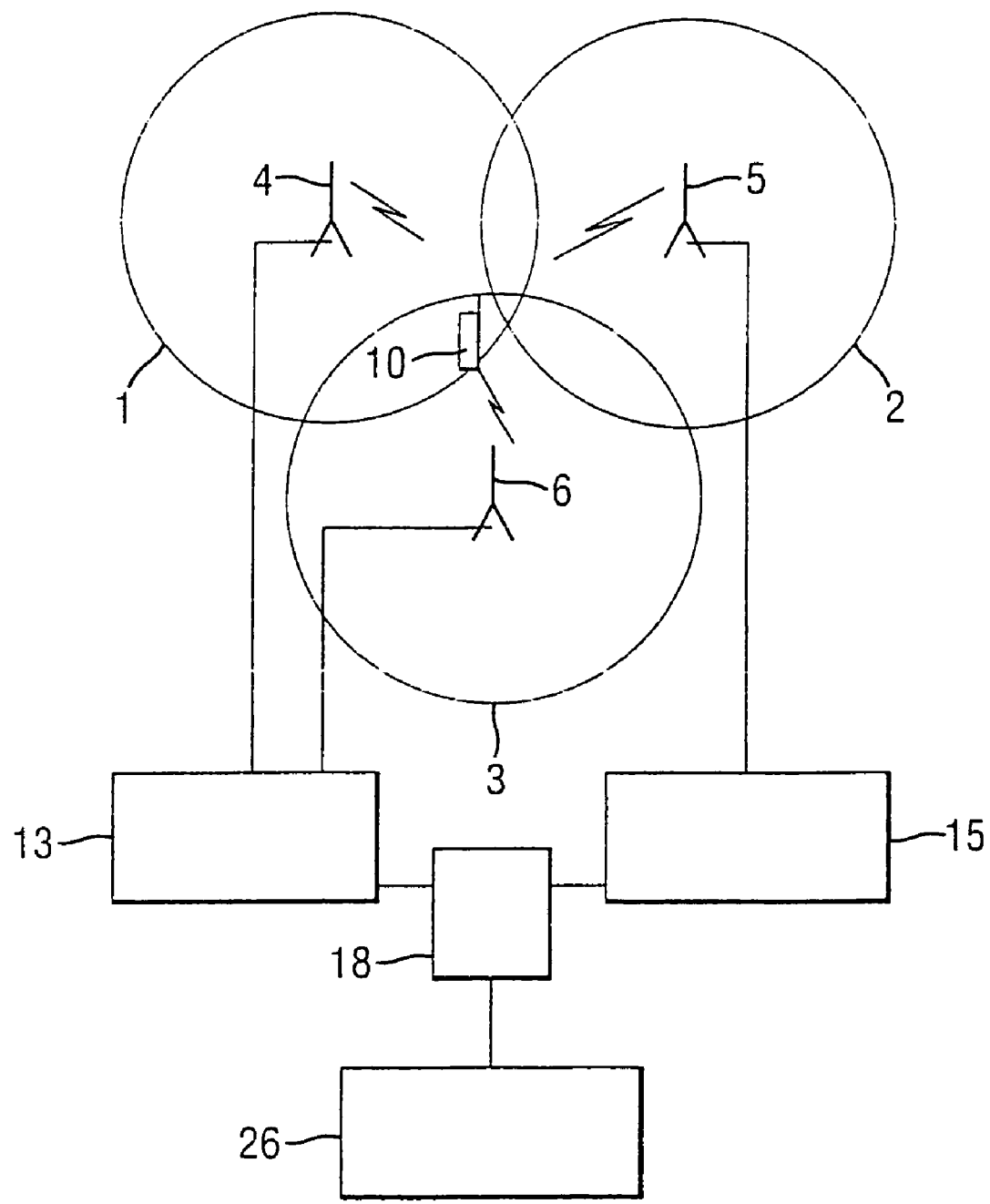

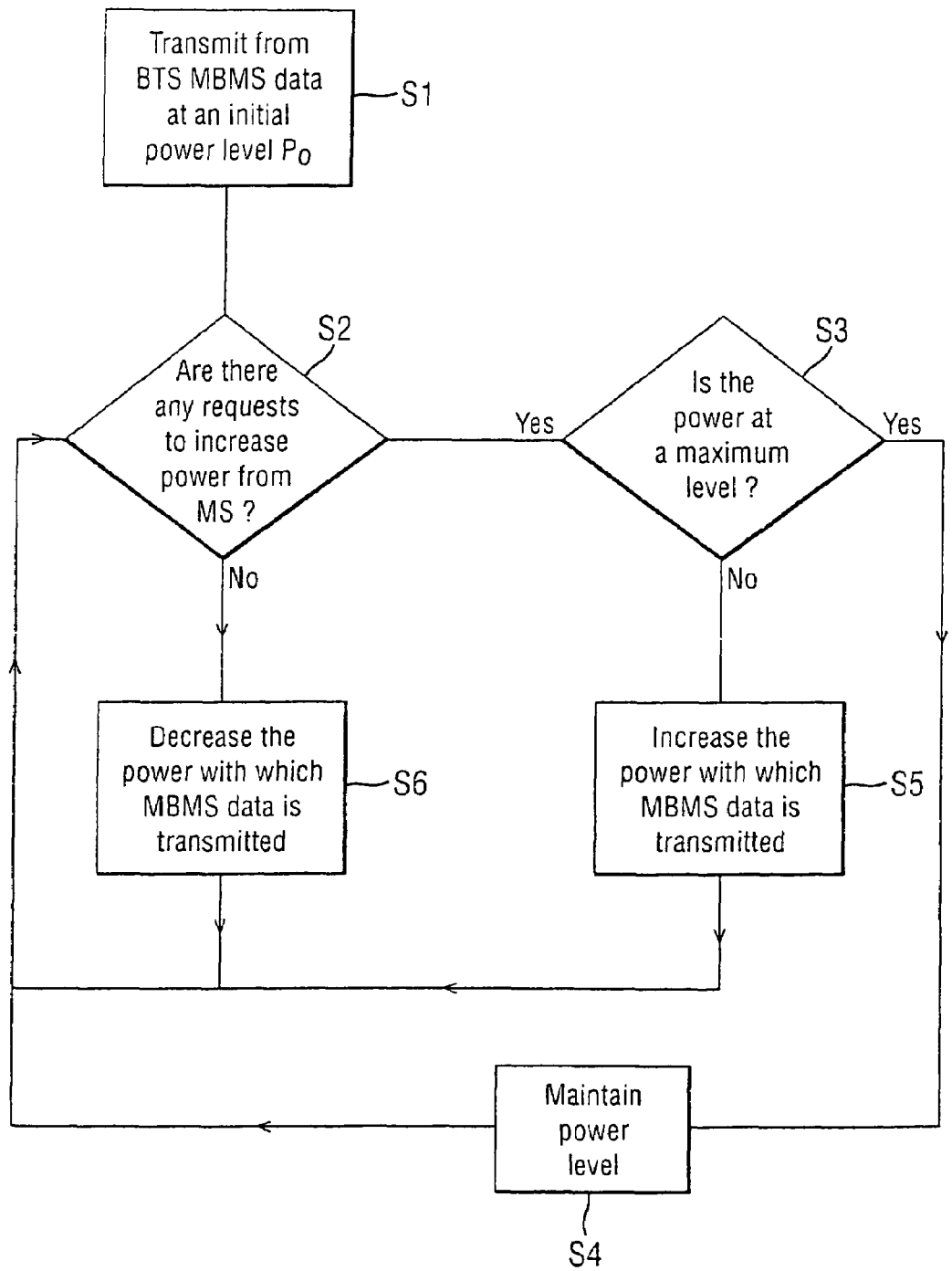

METHOD OF AND SYSTEM FOR WIRELESS COMMUNICATION

FIELD OF THE INVENTION

The present invention relates to a method of wireless communication and a system for wireless communication. More particularly the present invention relates to point to multipoint communication.

BACKGROUND OF THE INVENTION

A communication system can be seen as a facility that enables communication between two or more entities such as user equipment, elements of a communication network and other entities associated with a communication system. A communication system typically operates in accordance with a given standard or specification which sets out what the various entities associated with a communication system are permitted to do and how that should be achieved. For example, the standard specification may define if a user, or more precisely, user equipment or a terminal is provided with a circuit switched service and/or packet switched service. Communication protocols and/or parameters which shall be used for the connection may also be defined. In other words, a specific set of rules, in which the communication can be based needs to be defined to enable communication by means of the system.

Communication systems providing wireless communication for the user equipment are known. There are various known standards or proposals for standards including GSM (Global system for mobile communication), UMTS (universal mobile telecommunications system) and others. An example of a wireless is a cellular network. In cellular systems, a base transceiver station (BTS) or similar access entity serves mobile station (MS) or other such wireless user equipment (TIE) via a wireless interface between these entities. The communication between the mobile stations and the elements of the communication network can be based on appropriate communication protocol. The operation of the base station apparatus and other apparatus required for the communication can be controlled by one or several control entities. The various control entities may be interconnected. One or more gateway nodes may also be provided for connecting the cellular network to other networks. The other networks may comprise, for example, another mobile network, a public switched telephone network (PSTN) and/or other communication networks such as an IP (Internet Protocol) and/or other packet switched networks.

An example of a service that may be offered to the subscribers of a communication system is a so called multimedia service. An example of a communication system which is enabled to offer the multimedia services for the users is an IP (Internet Protocol) multimedia network. IP multimedia (IM) functionalities can be provided by means of an IP multimedia sub system (IMS). The data to be communicated in the multimedia application may comprise various types of data. For example, voice, video or other image data, streaming data, text data and other content data may be communicated via a communication system.

A multimedia application is the so called multimedia broadcasting multicasting service (MBMS). The MBMS can be described as a multimedia service that is arranged to transmit MBMS data to users which request the service by means of a point to point (P-t-P) and/or point to multipoint (P-t-M) connections. The multimedia broadcasting multicasting services can be divided into two modes—a broadcast mode and a multicast mode.

A broadcast service is a unidirectional point to multipoint service in which data is transmitted from a single source (for example a base station) to multiple user equipment in an associated broadcast service area. Broadcast services may be received by all users who have enabled the specific broadcast service locally on their user equipment and who are in the broadcast area defined for this service. In general, the mobile station is able to receive the MBMS data without any request for the services. The broadcast mode may use radio/network resources for transmission of data over a common radio channel.

The multicast services is a uni-directional point to multipoint service in which data is efficiently transmitted from a single source to a multicast group in the associated multicast service area. Multicast services can only be received by such users that are subscribed to the specific multicast services and have joined the multicast group associated with the specific service. The definitions of the broadcast service and multicast service are defined in the UMTS third generation partnership project specification number 3GPP TS 22.146, which is hereby incorporated by reference.

As with the broadcast mode, data may be transmitted via radio/network resources over a common radio channel. The multicast mode provides the possibilities for selective transmission to cells within the multicast service area. The selective cells contain members of a multicast group. A multicast service received by user may involve one or more successive multicast sessions. A multicast service might, for example, consist of a single on going session such as a multimedia stream. The multicast service may involve several intermittent multicast sessions over an extended period of time, for example messages to users.

A difference between the two MBMS modes is that in the broadcast mode all users within the service area are targeted whereas in the multicast mode it is possible to limit the number of target users, for example to predefine a subset of users in the service area. Furthermore, the modes differ in that in the broadcast mode there is no specific requirement to activate or subscribe to the MBMS.

In current proposals, the MBMS coverage in a cell is defined on certain presumptions of the user distribution in the area of the cell coverage i.e. only intended for part of the full service area. In reality, the distribution of the users can vary so that sometimes, the relevant users will be located close to the base station or the users will be at the cell boarder. As the MBMS service is transmitted with a point to multipoint connection, the output power of the BTS of the MBMS data channel is selected on the basis that a user at the edge of the cell should be able to receive the MBMS data channel with a certain quality of service.

Furthermore, the output power selected for the base transceiver station also is generally based on an assumption that there is a particular level of usage (and hence interference) of the cell. The inventors have realised that the base transceiver station, given the loading of the cell and the location of the users might be transmitting with an unnecessarily high output power.

SUMMARY OF THE INVENTION

Embodiments of the present invention aim to address the outlines problems above.

According to a first aspect of the present invention there is provided a method of wireless communication in which a first station is arranged to transmit at least one transmission which is intended for the reception by a plurality of second stations to provide a point to multipoint transmission, said method comprising a first determining step comprising determining in at least one of said second stations if the transmission which is received at said at least one second station satisfies a predetermined criteria, in response to information determined in said determining step, determining in a second determining step if the first station is to change the power with which the first station transmits to said plurality of second stations in the point to multipoint transmission and a power changing step comprising changing the power with which said first station transmits power if the second determining step determines that the power is to be changed.

According to a second aspect of the present invention, there is provided wireless communication system comprising a first station and a plurality of second stations, said first station being arranged to transmit at least one transmission which is intended to be received by a plurality of the second stations to provide a point to multipoint transmission, wherein at least one of said second stations comprises means for determining if the transmission which is received at said at least one second station satisfies a predetermined criteria, and said first station comprising determining means for if the first station is to change the power with which the first station transmits to said plurality of second stations in the point to multipoint transmission, dependent on the determination made by said at least one station and means for changing the power with which said first station transmits power if the determining means determines that the power is to be changed.

According to a third aspect of the present invention, there is provided a first station for use in a wireless communication system comprising said first station and a plurality of second stations, said first station being arranged to transmit at least one transmission which is intended to be received by a plurality of the second stations to provide a point to multipoint transmission and comprising: determining means for if the first station is to change the power with which the first station transmits to said plurality of second stations in the point to multipoint transmission, dependent on a determination made by said at least one station; and means for changing the power with which said first station transmits power if the determining means determines that the power is to be changed.

BRIEF DESCRIPTION OF DRAWINGS

For a better understanding of the present invention, reference will now be made by way of example only to the accompanying of drawings in which:

FIG. 2 shows part of the system of FIG. 1 in more detail;

FIG. 3b shows a cell with a base station multicasting to four users, in a different location to those shown in FIG. 3a; and FIG. 4 is a flow chart illustrating one embodiment of the present invention.

DESCRIPTION OF PREFERRED
EMBODIMENTS OF THE PRESENT
INVENTION

Figure 1:
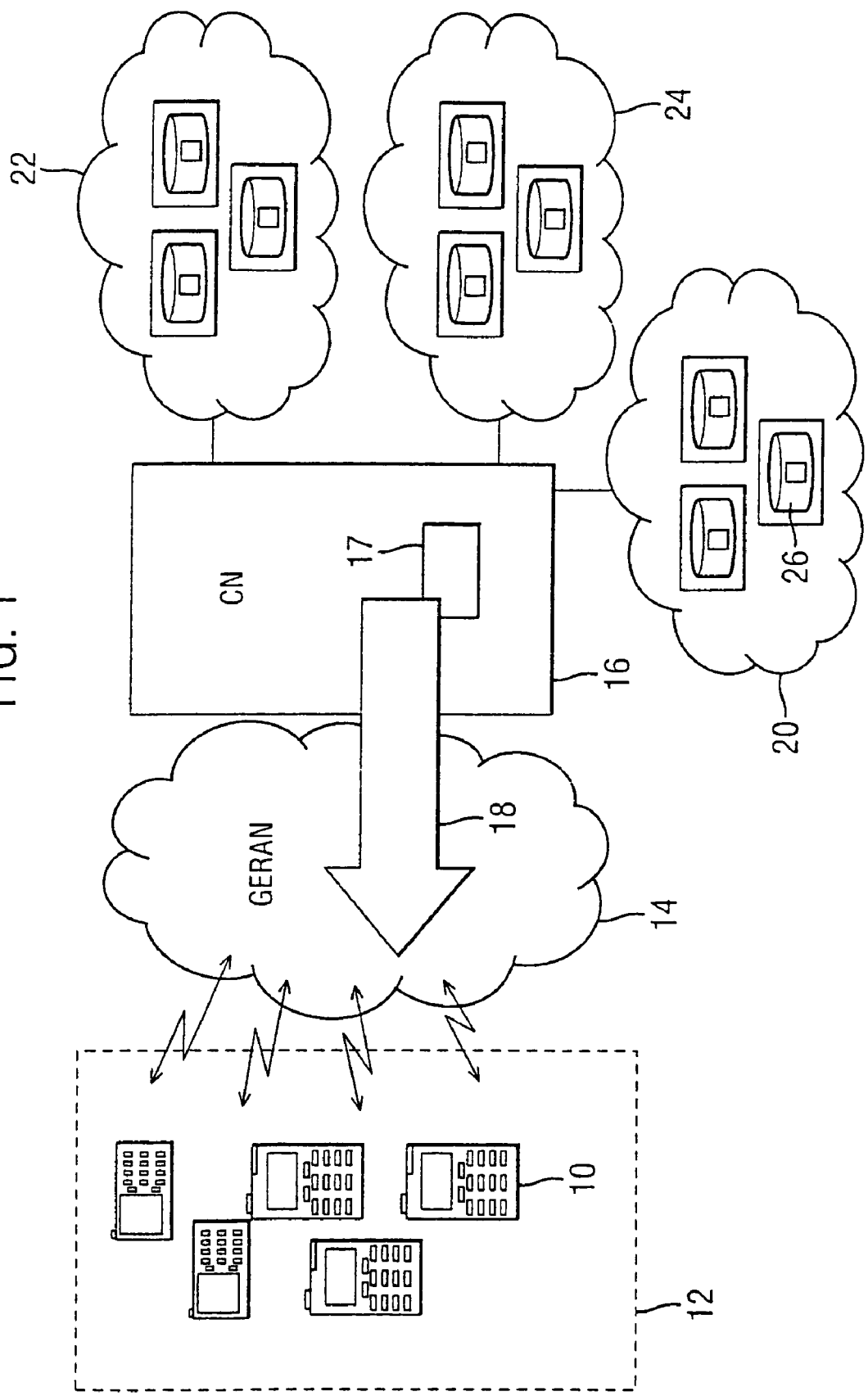
FIG. 1 shows a multimedia communication system.

Reference is made to FIG. 1 which shows a communication system architecture in which embodiments of the present invention may be incorporated. The communication system is shown to comprise a core network (CN) 16 and a radio access network, such as a GSM/EDGE radio access network, (GERAN) 14. The radio access network is serving mobile stations 10.

The core network (CN) 16 typically comprises various switching elements and gateways for enabling the communication via a number of radio access networks and also for interfacing the one cellular system with other communication systems such as with other cellular systems and/or fixed line communication systems. The core network elements may comprise elements such as mobile switching centres (MSC) and/or a packet data support node (PDSN) and gateways. These do not form an essential part of the present invention and are therefore omitted from the figures and will not be explained in any further detail.

FIG. 1 shows different service provision environments 20, 22 and 24 that are connected to the core network 16. The service provision environments can comprise, for example, operator specific services, Internet hosted services and multimedia services. Each of the service provision networks is shown to comprise service provider entities 26. A service provider entity can comprise a server or similar that is run and managed by service provider. The server provider entity is that actual provider of the content of the mobile station. The service provider entity does provide a possible source of data to be sent to the mobile station via the core network and radio access network of the communication system. This data is illustrated by means of arrow 18.

Mobile stations 10 subscribing to multicast mode services are shown to be located within a service area 12. The service area can be understood as an area in which a specific broadcast and/or multicast service is available. The service area can be defined individually per service. The service area may represent the coverage area of the entire mobile communication network, or parts of the coverage area there of. For example, a service area could be formed by the combination of three cells or even a single cell or any other number of cells.

A broadcasting control entity 17 arranged for the provision of broadcast and/or multicast control at the core network side is also shown. The broadcasting controller entity may be any appropriate entity configured for controlling broadcasting and/or multicasting in a mobile communication system. An example of a possible control entity is the broadcast multicast service centre (BM-SC) defined by 3GPP. Those interested will find a more detailed description of the BN-SC from the 3GPP specification TS 23.246 which is hereby incorporated by reference.

Reference is now made to FIG. 2 which is a simplified representation of a part of a cellular system. More particularly, three access entities, i.e. cells from the service area 12 of FIG. 1 are shown. In this shown arrangement, three base stations, 4, 5 and 6 provide three access entities or cells 1 to 3.

Each cell is controlled by an appropriate controller. The controller (13 or 15) may be provided by any appropriate controller. A controller may be provided for each base station of a controller to control a plurality of base stations. Solutions where controllers are provided at individual base stations and/or in the radio access network level for controlling a plurality of base stations are also known. It should be appreciated that the name, location and number of the radio access network controllers depends on the system. For example, a UMTS terrestrial radio access network (UTRAN) may employ a controller node that is referred to a radio network controller (RNC). In the GSM, CDMA 2000 (code division multiple access) and GPRS (general packet radio system) systems, the corresponding radio network controller entity is referred to as a base station controller (BSC) In this specification, all possible radio network controllers are denoted by the network controller elements 13 and 15 of FIG. 2.

It should be appreciated that the FIG. 2 representation is highly schematic and that in practice, the number of base stations and cells would be substantially higher. One cell may include more than one base station site. A base station apparatus or site may also provide more than one cell. The radio access network may also comprise only one cell. These features depend on the implementation and circumstances.

Each base station 4 to 6 is arranged to transmit signals to and receive signals from a mobile device of a mobile user via a wireless interface. The mobile user may use any appropriate mobile device adapted for Internet Protocol communication to connect to the network. For example, the mobile user may access a cellular network by means of a personal computer (PC), personal data assistant (PDA), mobile station (MS) and so on. The following examples are described in the context of a mobile station.

The user may user the mobile station 10 for tasks such as making and receiving phone calls, for receiving and sending data from and to the network, for example multimedia content. A mobile station may comprise an antenna element for wirelessly receiving and transmitting signals from and to base stations of the mobile communication network. A mobile station may also be provided with a display for displaying images and other graphical information for the user of the mobile user equipment. Speakers may also be provided. The operation of the mobile user equipment may be controlled by means of appropriate interface such as control buttons, voice commands and so on. Furthermore, a mobile station is typically provided with a processor entity and memory means.

Each of the mobile stations is able to transmit signals to and receive signals from the base stations via the wireless interface. It should be appreciated that although one mobile station is shown in FIG. 2 for clarity, a number of mobile stations may be in simultaneous communication with each base station.

Figure 3A:
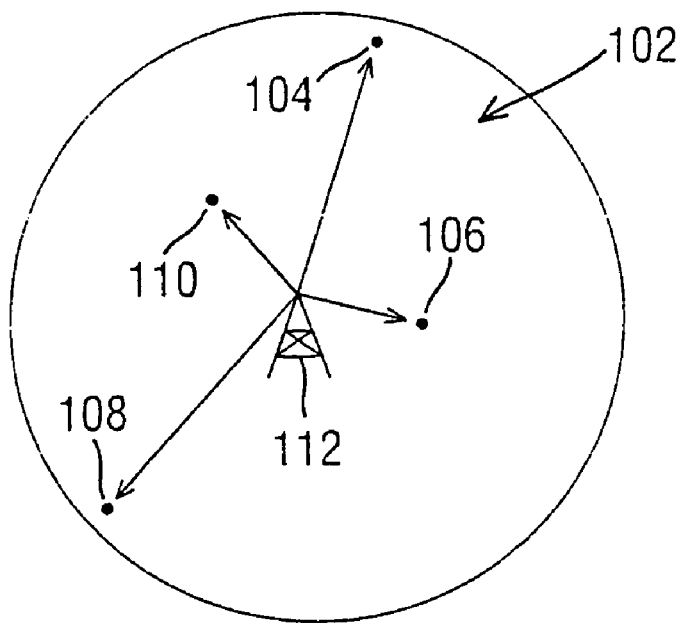
FIG. 3a shows a cell with a base station multicasting to four users.
Figure 3B:
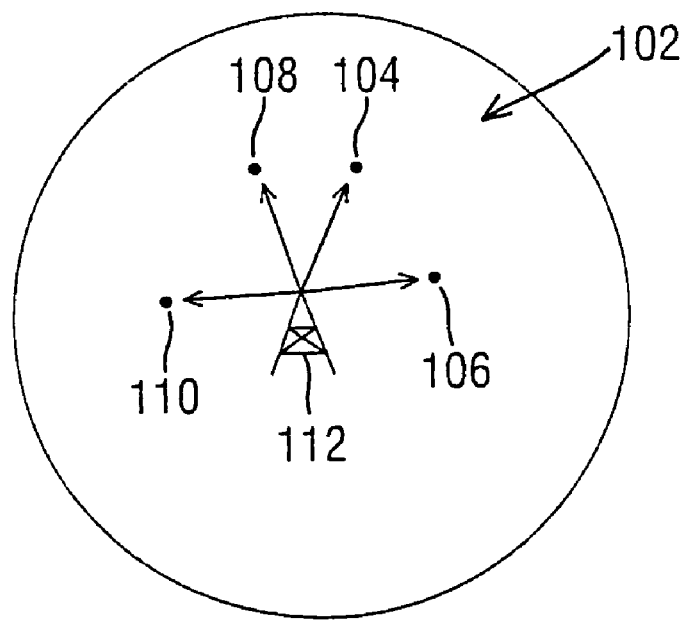

Reference now made to FIGS. 3a and 3b which explain the principles underlying embodiments of the present invention.

In FIG. 3a, a cell 102 is shown which is served by a base transceiver station 112. The base transceiver station 112 is in MBMS mode, either the broadcast or multicast mode and is transmitting to four mobile stations 104, 106, 108 and 110. As can be seen from FIG. 3a, some of the mobile stations 104 and 108 are near the edge of the cell whilst other of the mobile stations 106 and 110 are closer to the mobile station.

FIG. 3b shows the same cell 102, base station and mobile stations. However, the mobile stations have now been moved so that they are much closer to the base station. Thus, the base station 112 is not broadcasting to any mobile station which is near to the edge of the cell. With the current standard proposals, the power used by the base transceiver station in the situation shown in FIG. 3a would be the same used in the example shown in FIG. 3b. This means that effectively in the example shown in FIG. 3b, the base transceiver station 112 would be transmitting with a higher than necessary power.

Embodiments of the present invention are arranged to allow the power with which the base station transmits to take into account, for example, the distance of the actual users from the base station in a point to multipoint broadcast. Additionally or alternatively, other factors can be taken into account when determining the power level, such as cell loading or interference levels or the like.

In embodiments of the present invention, the MBMS data transmission is started with the power level $P_0$ that is supposed to be sufficient for the target MBMS coverage in the cell. The power level $P_0$ will start to be decreased slowly. The mobile station will send an up link message requesting a higher power level in the case where the quality of the received MBMS data is getting worse or a predefined criteria on the received quality of the MBMS data is non longer fulfilled. The mobile station sends the request message on a common dedicated uplink channel (dedicated to MBMS but common to all MBMS users on that cell). The uplink message can contain a parameter indicating the measured quality of the down link connection. The network will increase the output power after receiving the up link message until one of the following conditions occurs: no further requests are received from the mobile stations; it is decided that it is not feasible to increase the power level; or the transmission is already running with the maximum power.

The output power may stay at a given level until a timer expires. The timer will expire when there has been no further requests from mobile stations to increase power for a predetermined time. After that, the reduction of the output power level is again started. In one embodiment, the network can tune the power until only one or a few mobile stations keep sending up link requests and then based on the quality reports, the downlink power level can be continuously controlled according to the quality observed by the most distant mobile or mobiles.

Reference will now be made to FIG. 4 which shows a flow chart illustrating a method embodying the present invention.

In step S1, the MBMS data is transmitted at the start of the MBMS data session at a power level Po that is sufficient for the target MBMS coverage on the cells. In some embodiments of the present invention, the target coverage may be the entire cell or only part of the cell. The target power level may be the power level required to reach users at the outer edge of the cell. Alternatively, the power level that is initially used may be based on a previous MBMS session. This may be appropriate in the situation where low mobility is expected.

In step S2, a determination is made to see whether or not there are any requests to increase the power from the mobile station. The mobile station will send an up link message requesting a higher power level in the case where the quality of the received MBMS data is getting worse or a predefined criteria on the received data quality is no longer fulfilled. The predefined criteria could be a power level, a value of a quality measure or the like.

The predefined criteria may be provided to the mobile station in a service specific parameter separately for each cell in the MBMS notification message or in any other appropriate message, which is broadcast in the cell.

The up link message is sent on the PRACH channel (Packet Random Access Channel) or on a MBMS specific logical channel. The MBMS specific logical channel may be preferred in certain embodiments of the invention in that this does not use up any of the PRACH resources and also allows more free code points for quality reporting. As in the case of MBMS specific logical channel the uplink messages are new, no existing messages can be used, there is room in the uplink message for more alternatives of the reported parameter or for more alternative parameter values. In general more free (~unused) bits in message. In other words if the PRACH channel and the PRACH message are not use, there is no need to be limited to the available code points of that message. On the MBMS channel there is no need to distinguish a PRACH from this new MBMS specific power control/quality report message. The new MBMS specific logical channel could be the up link or part of the up link for the MBMS traffic channels. Preferably, the MBMS logical channel could use the same mapping as the PTCCH uplink channel (Packet Timing Advance Control Channel). Any of the sub channel may be used. The subchannel may be a subchannel of the PDCH carrying the MBMS channel or a subchannel of the PTCCH. This has the advantage in that the mobile station capability to receive the actual MBMS data on the downlink will not be reduced because on these specific TDMA frames the mobile station will have no downlink activity but instead will only send the power control/quality report message. The uplink and downlink channel mapping may be as defined in the third generation partnership project specification 3GPP TS 45.002 which is hereby incorporated by reference.

The logical channel can be separated into two categories that is traffic channels and control channels. The packet data traffic channels are unidirectional. Embodiments of the present invention may be concerned with the downlink channel for the MBMS data transfer from the base station to the mobile stations. The control channels are intended to carry signalling or synchronisation data. The packet broadcast control channels are arranged to broadcast parameters used by the mobile station to access a network for packet transmission operation. There may be packet common control channels.

The up link message could contain a parameter indicating the measured quality of the down link connection or may contain an indication of the message power at the mobile station of the received MBMS channel or an indication that power needs to be increased or any other suitable parameter.

Thus, in step S2 a determination is made as to whether or not a message has been received from any of the mobile stations to which a message or data has been broadcast or multicast which indicates that the power which the base transceiver station is using is not sufficient. If such a message has been received and processed by the base station, if necessary, then the next step would be step S3. In step S3, a determination is made as to the current transmission power used by the base transceiver station. It is determined whether the base station is already using the maximum power level. The maximum power level may be defined as the maximum power level with which the base transceiver station is capable of transmitting or in preferred embodiments of the present invention there is associated maximum power level for the MBMS mode. This maximum power level may be set during the network planning stage to be at a level at which all mobile stations in a cell, including those at the edge of the cell are able to receive the MBMS data with a given quality of service. If it is determined that the power level used by the base transceiver station is already at the maximum level, then the next step is step S4.

In step S4, the power level of the base transceiver station is maintained at its current level.

In one modification to the present invention, in step S3, the base station looks at the power at which it is transmitting to the mobile stations. It may process the results from the mobile station to see whether or not it would be feasible to increase the power level further. For example, the processing carried out by the base station may indicate that increasing the power would not bring any benefit. This might occur as the output power for the MBMS transmission has reached already the predefined maximum value or in case the MS has reported in the uplink message a too poor quality value for the received data (e.g. FER (Frame Error Rate) BER (Bit Error Rate) is too high) so that the BSS is not able to improve the DL quality to a sufficient level by increasing the output power up to the maximum level. In this scenario, step S4 would again be the next step.

If in step S3, it is determined that the power is not at a maximum level and optionally that increasing the power does bring a benefit, then the next step is step S5. In step S5, the power used by the base transceiver station to transmit the MBMS data is increased. In one embodiment of the present invention, the power is increased by a predetermined amount. The next step would then be S2 again. Thus, if the increase is not sufficient, one or more further requests for an increase in power will be received from the mobile station(s) and steps S3 and S5 would be repeated until the power has been increased to a level where the mobile stations are all able to received the MBMS data with the required quality level, the power level has reached its maximum or it is determined that there is no benefit in increasing the power any further.

Alternatively, the base station can process the request or requests received from the mobile station(s) to determine by how much the output power should be increased. In other words the output power is increased by an amount which is based on a reported parameter.

If it is determined that there are no requests to increase power from the mobile station, then the next step will be step S6. In this step, the power with which the MBMS data is transmitted is decreased. The power is decreased by a predefined amount and/or on the basis of reports received from one or more mobile stations. After the decrease of the power in step S6, the next step is step S2. If again there is no request to increase power, then step S6 is repeated. The decrease in power is carried out step wise until a request to increase the power is received.

It should be appreciated that in some embodiments of the invention, to give some stability to the power control, if there are no requests to increase power from the mobile station, the power is decreased in step S6 only if a predetermined time has expired without any requests being received from the mobile station.

It should be appreciated that step S2 follows step S4, S5 and S6.

It should be appreciated that embodiments of the present invention may use other base transceiver power control algorithms. For example, the base transceiver station could effectively identify what mobile stations are near the edge of the cell and respond to reports from those mobile stations only. This can be used for increasing and/or decreasing the power level.

It should be appreciated that in some embodiments of the present invention where the increase in power is not sufficient to guarantee an acceptable MBMS service quality for a certain period of time, the mobile station can request a point to point connection to continue the MBMS data reception. Alternatively, the network may set up a point to point connection based on a reported parameter. This would be advantageous in the case where it is determined that increasing the output power is not feasible. In some embodiments, the network may also deny the establishment of a point to point connection if the available network resources are insufficient.

Embodiments of the present invention have been described in the context of a GSM network and in particular a GERAN network. It should be appreciate that embodiments of the present invention can be applied in other GS~4 network as well as other types of wireless networks. For example CDMA networks, TDMA (time division multiple access) networks, FDMA (frequency division multiple access) networks or networks using a combination of the above access technologies.

Embodiments of the present invention have been described in the context of MBMS services. It should be appreciated that embodiments of the present invention can be used in other point to multipoint connections.

The invention claimed is:

1. A method, comprising:
   receiving at a base station information from at least one of a plurality of mobile stations, said information indicating whether at least one transmission transmitted by said base station satisfies predetermined criteria;

determining, at a power level unit and in response to said received information, when said base station is to change a power level with which said base station transmits said at least one transmission to said at least one mobile station in a point to multipoint transmission; and changing said power level with which said base station transmits power when a determination has been made that said power level is to be changed, wherein when said received information indicates that said predetermined criteria has not been satisfied, said determining comprises determining that said power level with which said base station transmits is to be increased, wherein said determining comprises determining at the power level unit whether increasing said power level with which said base station transmits said at least one transmission would improve reception of said at least one transmission by said at least one mobile station, and wherein when said base station is transmitting at a maximum power, said determining comprises determining that a constant power level used by said base station is to be maintained.

2. A method as claimed in claim 1, wherein when a determination is made that increasing said power level would improve said reception, said determining comprises determining that said power level at which said base station transmits is to be increased.

3. A method as claimed in claim 1, further comprising:
selecting for said base station a maximum power level to initially transmit said at least one transmission to said at least one of said plurality of mobile stations.

4. A method as claimed in claim 1, further comprising:
selecting for said base station a power level used in a previous transmission to initially transmit said at least one transmission to said at least one of said plurality of mobile stations.

5. A method as claimed in claim 1, further comprising:
sending said information from said at least one mobile station to said base station.

6. A method as claimed in claim 5, wherein said sending comprises sending said information in at least one of a traffic channel, a logical channel, and a control channel.

7. A method as claimed in claim 1, wherein said determining comprises determining said change of said power level in response to said information received, said information comprising at least one of a request for increased power, a measurement report, and information that said predetermined criteria is not satisfied.

8. A method as claimed in claim 1, wherein said information received comprises information as to whether said at least one transmission satisfies said predetermined criteria comprising at least one of a received power and quality of data.

9. A method as claimed in claim 1, further comprising:
identifying at least one mobile station which requires a higher transmission power level; and
controlling said power level with which said base station transmits in response to said information provided by an identified at least one mobile station.

10. A method as claimed in claim 1, wherein said information received comprises information as to when at least one transmission comprising multimedia broadcasting multicasting service data satisfies said predetermined criteria.

11. A method as claimed in claim 1, wherein said information received comprises information as to when at least one transmission comprising at least one of a broadcast transmission and a multicast transmission satisfies said predetermined criteria.

12. A method as claimed in claim 1, further comprising:
setting up a point to point connection between said base station and one of said mobile stations when said point to multipoint connection between said base station and said one of said mobile stations falls below a given quality level.

13. A system, comprising:
a base station; and
a plurality of mobile stations,
wherein said base station is configured to transmit at least one transmission to be received by at least one of said plurality of mobile stations to provide a point to multipoint transmission,
wherein said at least one of said plurality of mobile stations comprises a transmission determination unit configured to determine whether said at least one transmission which is received by said at least one mobile station satisfies predetermined criteria,
wherein said base station comprises a power level unit configured to determine when said base station is to change a power level with which said base station transmits said at least one transmission to said plurality of mobile stations in said point to multipoint transmission, depending upon a determination made by said at least one of said plurality of mobile stations, and further configured to change said power level with which said base station transmits power when said power level unit determines that said power level is to be changed,
wherein said power level unit is configured to determine when information has been received indicating that said predetermined criteria has not been satisfied and to determine whether increasing said power level with which said base station transmits said at least one transmission would improve reception of said at least one transmission by said at least one mobile station, and
wherein when no information is received, said power level unit of said base station is further configured to reduce said power level with which said base station transmits.

14. The system as claimed in claim 13, wherein when a determination is made that increasing said power level would improve said reception, said power level unit of said base station is further configured to increase said power level.

15. An apparatus, comprising:
a power level unit configured to determine when a base station is to change a power level with which said base station transmits at least one transmission to a plurality of mobile stations in a point to multipoint transmission, depending on information received from at least one of said plurality of mobile stations as to whether said at least one transmission satisfies predetermined criteria; and further configured to change said power level with which said base station transmits when said power level unit determines that said power level is to be changed,
wherein said power level unit is further configured to determine when information has been received indicating that said predetermined criteria has not been satisfied, and to determine whether increasing said power level with which said base station transmits said at least one transmission would improve reception of said at least one transmission by said at least one of said plurality of mobile stations, and
wherein when no information is received, said power level unit of said apparatus is further configured to reduce said power level with which said base station transmits.

16. The apparatus of claim 15, wherein said power level unit of said apparatus is further configured to increase said power level when a determination is made that increasing said power level would improve said reception.

17. The apparatus of claim 15, wherein when information is received, said power level unit of said apparatus is further configured to increase said power level with which said base station transmits.

18. A method, comprising:

receiving at a base station information from at least one of a plurality of mobile stations, said information indicating whether at least one transmission transmitted by said base station satisfies predetermined criteria;

determining, at a power level unit and in response to said received information, when a base station is to change a power level with which said base station transmits said at least one transmission to said at least one mobile station in a point to multipoint transmission; and changing said power level with which said base station transmits power when said determining determines that said power level is to be changed, wherein said determining comprises determining at the power level unit whether increasing said power level with which said base station transmits said at least one transmission would improve reception of said at least one transmission by said at least one mobile station;

the method further comprising setting up a point to point connection between said base station and one of said mobile stations when said point to multipoint connection between said base station and said one of said mobile stations falls below a given quality level.

* * * * *